CHARLES W. REGNAUD
INVENTOR.

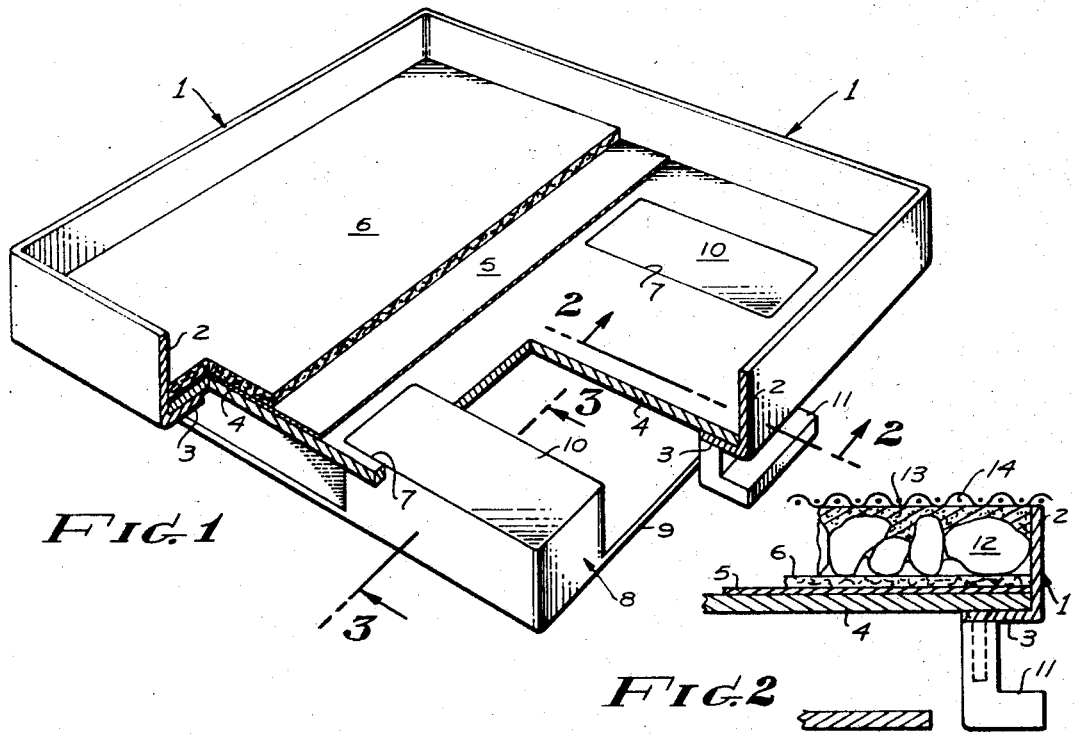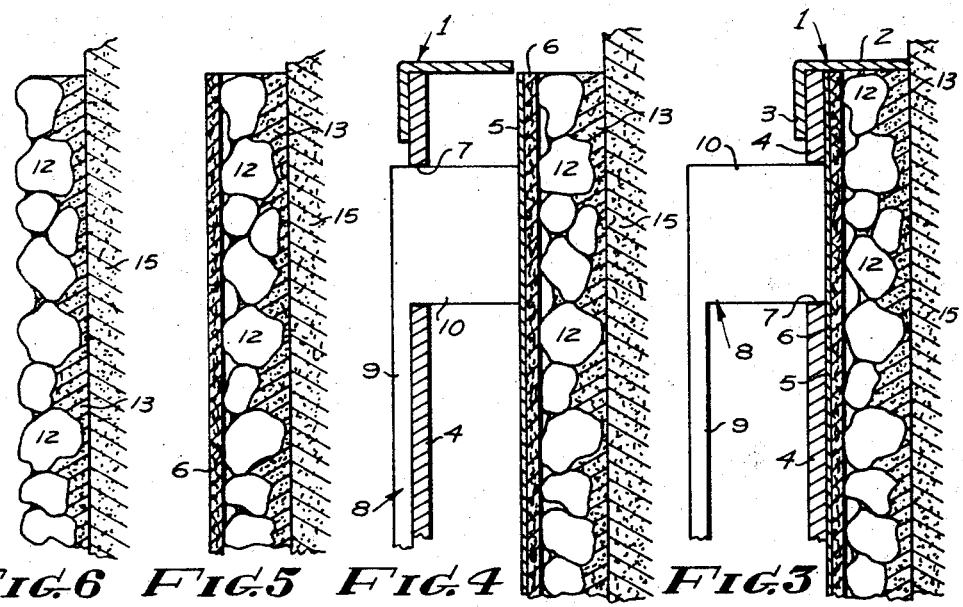

BY Lyon+Lyon
ATTORNEYS

United States Patent Office 3,441,457
Patented Apr. 29, 1969

3,441,457
MEANS AND METHOD OF PRODUCING CEMENT TILE VENEER
Charles W. Regnaud, 503 Alcott Ave.,
Pomona, Calif. 91766
Filed Sept. 22, 1965, Ser. No. 489,343
Int. Cl. B44c 1/06; B28b 5/00
U.S. Cl. 156—71                                      7 Claims

ABSTRACT OF THE DISCLOSURE

A means and method of applying a veneer of ornamental stones and a layer of cement to a vertical or horizontal surface, the stones first being placed on a moisture absorbent pad, covered with the cement layer, and then, before the cement has set, the pad stones and cement are transferred as a unit to the selected surface. To accomplish this, the unit is initially held within a frame, then transported to the point of use in a frame equipped with ejector pads to push the unit free.

SUMMARY OF THE INVENTION

This invention relates to means and method of producing cement tile veneer and included in the objects of this invention are:

First, to provide a means and method of producing a veneer comprising ornamental stones set in a backing of cement which may be applied directly to a horizontal or vertical surface while the cement is in a plastic state in such a manner that the cement bonds to the surface against which it is applied.

Second, to provide a means and method according to the first object which, by reason of the fact that the veneer is applied immediately while the cement is in a plastic state, precasting and storing of the veneer is eliminated, and the number of molds or forming means is minimized.

Third, to provide a means and method of producing a cement tile veneer which involves a minimum of equipment production of the cement tile veneer at the point of use.

Fourth, to produce a means and method whereby a cement tile veneer may be applied to cement brick at a central location for later transportation to the point of use.

With the above and other objects in view as may appear hereinafter, reference is directed to the accompanying drawings in which:

FIGURE 1 is a perspective view with portions broken away showing the means for producing cement tile veneer.

FIGURE 2 is a fragmentary sectional view taken through 2—2 of FIGURE 1 showing the ingredients of the tile within the tile producing means and indicating a screen employed in the process of producing the tile veneer.

FIGURE 3 is a fragmentary sectional view taken through 3—3 of FIGURE 1 showing the initial step of applying the tile veneer to a vertical wall surface.

FIGURE 4 is a similar fragmentary sectional view showing the succeeding step in applying the tile veneer.

FIGURE 5 is a similar fragmentary sectional view showing the tile veneer after removal of the means for producing the tile veneer.

FIGURE 6 is a similar fragmentary sectional view showing the finished tile veneer bonded to the wall surface.

Figure 7:
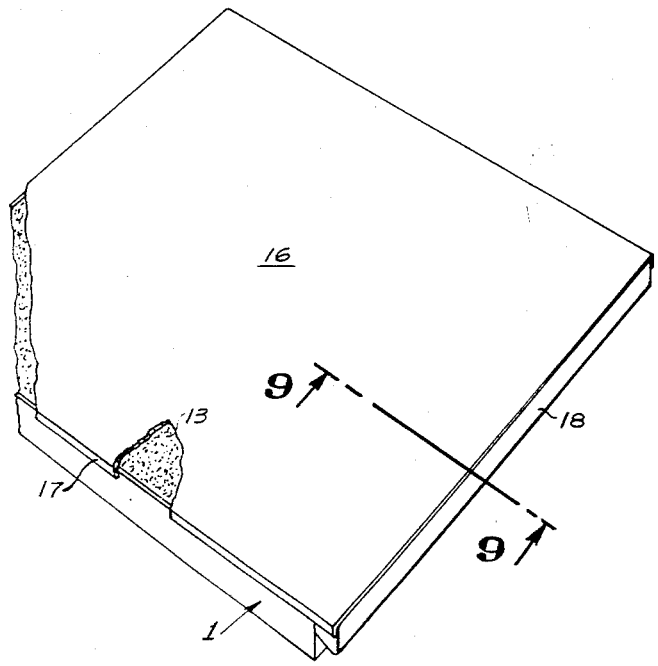
FIGURE 7 is a perspective view of the means for producing cement tile veneer adapted for the application of the veneer to a horizontal surface.
Figure 8:
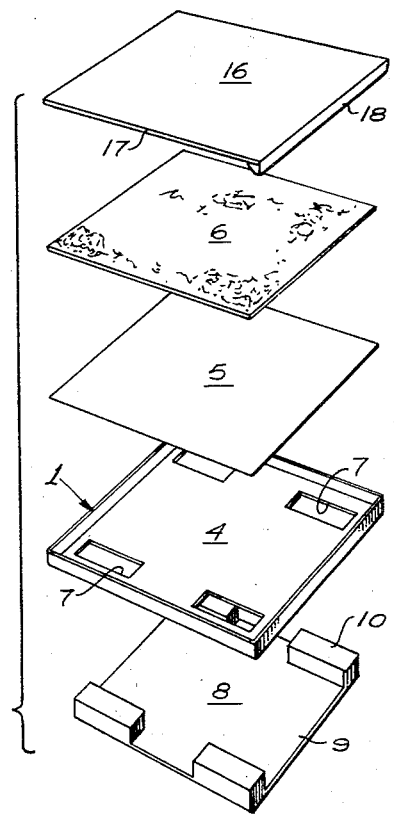
FIGURE 8 is an exploded perspective view showing the various parts of the means for producing the cement tile veneer.
Figure 9:
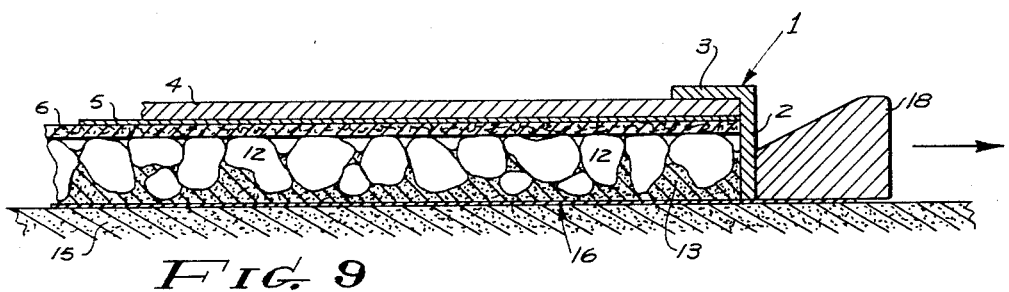
FIGURE 9 is a fragmentary sectional view taken through 9—9 of FIGURE 7 showing the means for producing the cement tile veneer inverted and in place on a horizontal surface.

The means for producing cement tile veneer includes a frame 1 dimensioned to define the margins of the tile veneer. For purposes of illustration, the frame shown is adapted for producing tile of relatively small dimension. The frame is preferably formed of angle metal forming a marginal wall 2 and an inturned flange 3. Secured to the flange 3 is a bottom panel 4. A sheet metal cover plate 5 overlies the bottom panel and, in turn supports an absorbent pad 6.

The absorbent pad has an important function in the formation of the tile veneer. The pad, in addition to having water absorbent properties, should be capable of reuse and have such chemical composition as to withstand the chemical action of a cement mixture. By way of example, it has been found satisfactory to utilize 30 lb. roofing felt which has been coated and impregnated with a water absorbing media. For example, a mixture of 1/3 sodium silica and 2/3 china clay has been found satisfactory. The china clay may be modified by the addition of rock dust and silica powder.

The bottom panel 4 is provided with several relatively large apertures 7. Disposed under the bottom panel 4 is an ejector 8 comprising a plate 9 and a plurality of ejector bosses 10 adapted to pass through the apertures 7. At opposite margins, the frame 1 is provided with handles 11.

If desired, the bottom panel 4 need not be fastened to the frame, but in itself may constitute an ejector.

The method of producing cement tile veneer is essentially as follows:

The frame 1 is mounted on a suitable horizontal surface which provides clearance for the handles 11, in which case the ejector is removed. Alternatively, the frame may be so supported that the ejector is in its retracted position. It is preferred to mount the frame on a table which is capable of being vibrated, preferably in a horizontal plane.

The pad 6 is covered with an aggregate 12 comprising ornamental stones or pebbles, most of which occupy a substantial proportion of the intended thickness of the tile. The stones or pebbles comprising the aggregate are packed in mutual contact, preferably in a single layer and in such a manner that as many as possible are in contact with the absorbent pad. With the pebbles or stones so positioned, the free space between them is minimized. Vibration of the tray comprising the frame 1 and absorbent pad 6 aids in the proper filling of the tray and in positioning most of the pebbles or stones in contact with the absorbent pad 6.

A cement-water mixture 13 is prepared which may be in itself conventional, but may, if desired, contain ingredients which enhance its adhesiveness. The consistency of the mixture is approximately that which is customarily chosen for the trowelling of a cement-water mixture on a wall or other surface. A screen 14 is positioned over the frame 1 and the cement-water mixture 13 is forced through the screen and the tray is vibrated. When sufficient quantity of the mixture has been placed in the tray, the screen may be used as a levelling device to insure that the mixture is flush with the upper edge of the wall 2 or a suitable scraper may be drawn across the frame 1 to remove excess mixture.

During the step of filling the tray with the cement-water mixture 13, the absorbent pad appears to play an important part in causing the stones or pebbles comprising the aggregate to be exposed in relief; that is, the cement mixture does not completely fill the void between the stones or the pebbles in the region adjacent the absorbent pad.

It has been determined from observation that the absorbent pad collects water and that this water is supplied from the cement-water mixture. The absorption of water from the cement-water mixture causes sufficient solidification of the mixture of the regions between the stones or pebbles to minimize the flow of the cement-water mixture through and completely around the aggregate.

After the cement-water mixture 13 has been applied and its upper surface made flush with the walls 2, the tray is transported to the mounting surface 15 intended to receive the veneer. The mounting surface may be a cement or brick wall. In any case, it is essential that the mounting surface be water absorbent. The water-cement ratio of the mixture is such that the tray may be tilted to a vertical position and applied to a vertical surface without displacement of the cement-water mixture or the pebbles. This operation is done rather quickly to minimize any tendency of the cement-water mixture to slump or be displaced.

When the veneer tile is applied to the vertical surface, the mounting surface absorbs moisture from the cement-water mixture and tends to bond thereto, at the same time reducing further any tendency of the cement-water mixture to slump. It should be observed that this operation is performed while the cement-water mixture is in a plastic state; that is, within a few minutes after the mixture has been received in the tray.

When the tile veneer is first applied to the mounting surface 15, it appears as shown in FIGURE 3; that is, the tile ingredients comprising the aggregate 12 and cement-water mixture 13 are retained within the walls 2 of the frame 1 and the walls bear against the mounting surface 15.

The ejector 8 is then employed to eject the tile ingredients, absorbent pad 6 and plate 5 as a unit from the frame. This is acomplished by pressing the bosses 10 of the ejector against the plate 5 while pulling outward on the handles 11 of the frame. In practice, one's thumbs are pressed against the plate 9 of the ejector 8 while the fingers draw outwardly on the handles 11.

After the tile ingredients have been ejected, the frame, including the ejector, bottom panel 4 and plate 5 are removed, leaving only the absorbent pad 6 as shown in FIGURE 5. The absorbent pad may be manually pressed so as to force the entire inner surface of the cement-water mixture 13 tightly against the mounting surface 15; or, a soft roller may be passed over the absorbent pad to accomplish this purpose.

The walls 2 of the frame 1 are preferably as thin as is feasible for the loads imposed so that when one tile is placed adjacent a previously applied tile, the crack or space between the tile is minimized. If desired, the space between the tile may be later filled with grouting so that each tile is bordered; however, by reason of the fact that the cement-water mixture is in a plastic condition, it is possible, by manual or roller pressure, to cause some marginal displacement of the tile so that the cracks or grooves tween the tile may be obliterated.

Still further, while it is desirable that the mounting surface 15 be flat, the tile veneer may be distorted within limits so as to conform to an irregular or curved mounting surface without destroying the integrity of the tile.

While the plastic cement-water mixture may be retained momentarily in the frame when moved merely to a vertical position, any attempt to invert the frame would discharge the contents; therefore, in order to apply the tile veneer to a floor surface or the like, a retainer plate 16 is employed.

The retainer plate is preferably formed of sheet metal and is provided with flanges 17 at two opposite sides. A third side is provided with a handlebar 18. The retainer plate is dimensioned to fit over the frame 1 with the flanges 17 and the handlebar 18 overlying the walls 2 as shown in FIGURE 7.

After the tray has been filled, the retainer plate is positioned on the floor surface, the retainer plate is removed while holding the frame firmly in place. After the retainer plate is removed, the tile ingredients and absorbent pad are ejected from the frame as previously described; and also as previously described, the cement-water mixture is pressed firmly against the horizontal mounting surface.

The absorbent pad may be removed almost immediately after the tile veneer has been pressed into place or may be left on until after an initial set has occurred. It should be noted that the surface of the pad is such that the tendency of the pad to adhere is minimized, and that the pad should be porous as to prevent its adherence by suction. Also, it is desirable that the pad be reusable after it has been dried.

It should be understood that the term cement-water mixture as herein used is intended to include a mixture containing sand as well as cement.

It should be noted that while the aggregate is illustrated as in the form of irregular stones or pebbles, that the aggregate may comprise regular pieces, such as small tile. Furthermore, the small tile may be initially glued to a temporary mounting sheet of paper or the like.

In some cases, the aggregate may be small ornamental particles distributed in the cement-water mixture, or may be omitted entirely. In the latter case, the method and apparatus are useful in applying mortar uniformly between bricks. More particularly, amateurs attempting to lay brick have great difficulty in applying mortar uniformly; however, by applying the mortar in the manner of tile as hereinbefore described an amateur may produce a professional-appearing wall.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:
1. A method of producing concrete tile veneer, characterized by:
   (a) placing an aggregate in contiguous relation on a pad of absorbent material;
   (b) covering the aggregate with cement-water mixture to form a continuous flat surface at the opposite side of said aggregate from said pad;
   (c) transferring the cement-water mixture aggregate and pad as a unit to a flat moisture absorbent surface while the cement-water mixture is in a plastic state;
   (d) pressing said pad to cause said cement-water mixture to bond to said surface;
   (e) and removing said absorbent pad from said aggregate after said cement-water mixture is bonded to said surface.

2. A method of producing concrete tile veneer, characterized by:
   (a) placing aggregate in contiguous relation on a pad of absorbent material bounded by retaining walls;
   (b) covering the aggregate with a cement-water mixture to the depth of said walls to form a continuous flat surface at the side opposite from said pad;
   (c) transporting the cement-water mixture, aggregate and pad, while retained within said walls, to a moisture absorbent mounting surface before the cement-water mixture has set;
   (d) ejecting said cement-water mixture from within said walls while pressing said cement-water mixture against said mounting surface.

3. A method of producing concrete tile veneer, characterized by:
   (a) placing aggregate within a retaining frame;
   (b) covering the aggregate with a cement-water mixture to form a continuous flat surface;

(c) covering said frame and said surface with a retainer plate;
(d) inverting the frame on a water absorbent mounting surface, with said plate interposed between said mounting surface and said cement-water mixture, while said cement-water mixture is in a plastic state;
(e) withdrawing said plate from between said frame and said mounting surface;
(f) pressing said cement-water mixture against said mounting surface;
(g) and withdrawing said frame to expose said aggregate.

4. A method of producing concrete tile veneer, characterized by:
(a) placing aggregate on an absorbent pad contained within a retaining frame;
(b) covering the aggregate with a cement-water mixture to form a continuous flat surface at the side of said aggregate opposite from said pad;
(c) covering said frame and said surface with a retainer plate;
(d) inverting the frame on a water absorbent mounting surface, with said plate interposed between said mounting surface and said cement-water mixture, while said cement-water mixture is in a plastic state;
(e) withdrawing said plate from between said frame and said mounting surface;
(f) withdrawing said frame while said pad remains on and covers said aggregate;
(g) pressing said pad to force said cement-water mixture into bonding contact with said mounting surface;
(h) and removing said pad.

5. Means for producing cement tile veneer, comprising:
(a) a frame defining the boundaries of a tile;
(b) an absorbent pad covering the said frame and determining with the walls of the frame the thickness of the tile;
(c) said pad adapted to be covered with a layer of aggregate, the aggregate, in turn, being covered by a cement-water mixture, and said pad and frame forming a means for transporting said aggregate and cement-water mixture to a surface to be veneered;
(d) and means for ejecting said pad, aggregate and cement-water mixture as a unit from said frame against said surface.

6. Means for producing cement tile veneer, comprising:
(a) a shallow forming and transporting tray having a bottom and side walls defining the boundaries of a tile;
(b) a removable water absorbent pad covering the bottom of said tray and defining with said side walls, the thickness of said tile;
(c) said tray adapted to receive the ingredients of a tile, including a layer of aggregate covering said pad and a layer of a cement-water mixture embedding said aggregate;
(d) and means for pressing said pad and tile ingredients from said tray while said tray is in confronting relation to a mounting surface, thereby to press said cement-water mixture into bonding engagement with said surface.

7. Means for producing cement tile veneer, comprising:
(a) a shallow forming and transporting tray having a bottom and side walls defining the boundaries of a tile;
(b) a removable water absorbent pad covering the bottom of said tray and defining with said side walls, the thickness of said tile;
(c) said tray adapted to receive the ingredients of a tile, including a layer of aggregate covering said pad and a layer of a cement-water mixture embedding said aggregate;
(d) a retainer plate fitting said tray for covering said cement-water mixture to hold said mixture therein thereby to permit inversion of said tray over a mounting surface, said plate being laterally removable from between said tray and said mounting surface to expose said cement-water mixture to said surface;
(e) and means for pressing said pad and tile ingredients from said tray as a unit and forcing said cement-water mixture into bonding engagement with said mounting surface.

References Cited

UNITED STATES PATENTS

| | | | |
|---|---|---|---|
| 313,221 | 3/1885 | Marsh | 264—246 |
| 2,708,783 | 5/1955 | Ripley | 25—1 X |
| 2,890,492 | 6/1959 | Smith | 264—256 X |
| 2,893,098 | 7/1959 | Tilley | 25—122 X |
| 3,002,249 | 10/1961 | Jackson | 25—1 X |
| 3,058,190 | 10/1962 | Wogulis et al. | 25—1 |
| 3,070,866 | 1/1963 | Kastenbein | 25—1 X |
| 3,239,590 | 3/1966 | Trimble | 156—230 X |
| 3,303,545 | 2/1967 | Heitzman | 25—122 X |

HAROLD ANSHER, *Primary Examiner.*

U.S. Cl. X.R.

156—232, 249; 264—31, 247, 256; 249—112, 115; 25—122, 123; 52—745, 746